J. W. SMITH.
AIR PUMP.
APPLICATION FILED MAY 8, 1920.
1,378,910. Patented May 24, 1921.
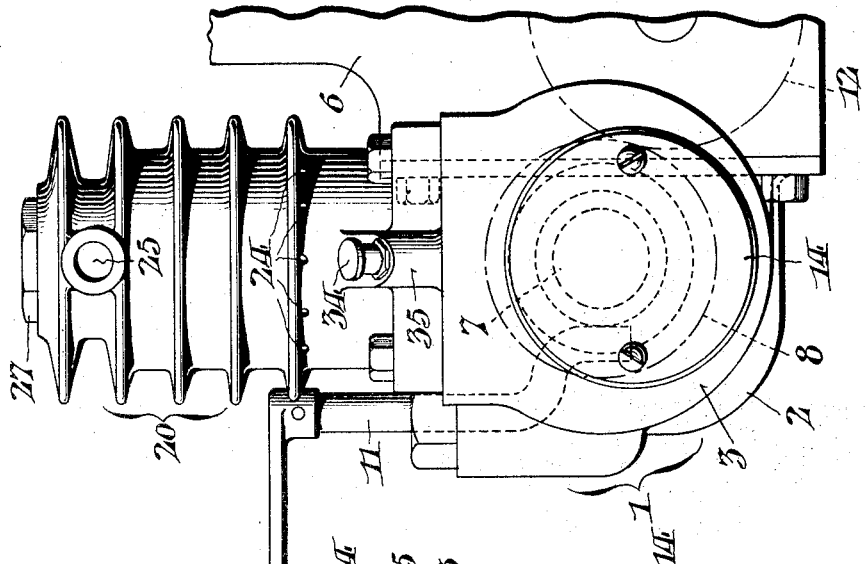
FIG. I.
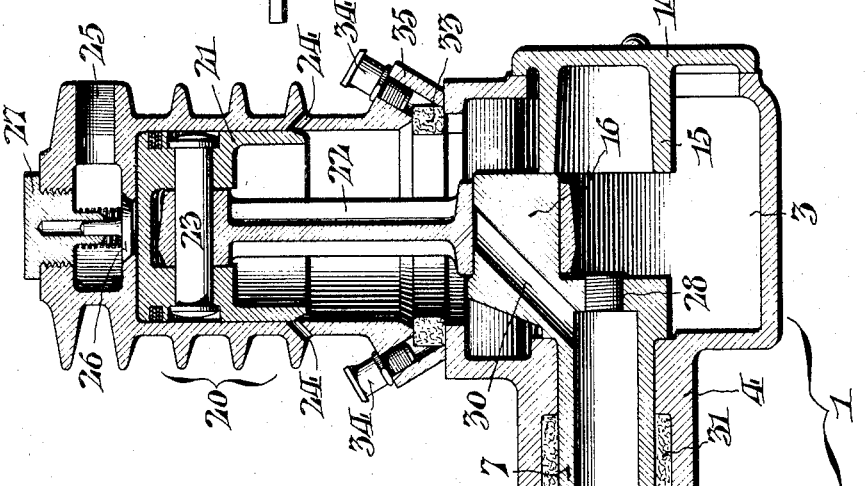
FIG. II.
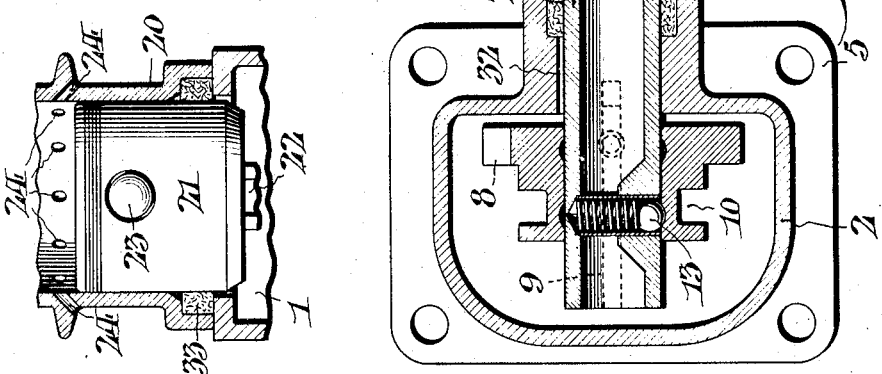
FIG. III.
WITNESSES:
John C. Bergner.
James H. Bell.
INVENTOR:
John W. Smith,
BY
Foley & Paul
ATTORNEYS.

UNITED STATES PATENT OFFICE.

JOHN W. SMITH, OF PHILADELPHIA, PENNSYLVANIA.

AIR-PUMP.

1,378,910. Specification of Letters Patent. Patented May 24, 1921.

Application filed May 8, 1920. Serial No. 379,782.

*To all whom it may concern:*

Be it known that I, JOHN W. SMITH, a citizen of the United States, residing in Philadelphia, in the county of Philadelphia and State of Pennsylvania, have invented certain new and useful Improvements in Air-Pumps, whereof the following is a specification, reference being had to the accompanying drawings.

My invention relates to air-pumps and the like, being especially concerned with the lubrication of such pumps. It is my aim to afford thorough lubrication of the operating parts of the pump without risk of contaminating the air handled by the pump with lubricant, such as oil,—which would injure the rubber of an automobile tire, if the air should be used for tire inflation,—as well as to secure various other advantages. How such advantages can be secured through my invention will become apparent from the description hereinafter of the best embodiment at present known to me as employed for an automobile tire pump, while the scope and essentials of the invention will be indicated in my claims.

In the drawings, Figure I is an end elevation of a pump constructed in accordance with my invention mounted upon the gear-case of an automobile.

Fig. II is a side view with the pump parts in section at a central plane.

Fig. III is a fragmentary sectional view through the pump cylinder at right angles to Fig. I, the pump piston appearing unsectioned.

Referring first to Figs. I and II, it will be seen that the pump comprises a gear and crank casing 1, here shown as a unitary, integral structure having separate gear and crank chambers 2 and 3 interconnected by a bearing sleeve 4. The gear chamber 2 has a lateral opening surrounded by a flange 5 by means of which the casing structure 1 is secured to the automobile gear casing 6. In the bore of the bearing sleeve 4 is mounted a crank shaft member 7, preferably made of anti-friction metal in a single piece. In the gear chamber 2 is a driving pinion 8 splined on the shaft at 9 and grooved at 10 for engagement with one arm of a bell crank member 11, by means of which said pinion 8 may be shifted into mesh with the gear 12 of the automobile transmission inclosed in the case 6, or vice versa,—a spring pressed ball catch 13 serving to retain the pinion member 8 definitely in either of its axial positions on the crank shaft 7. In the wall of the crank chamber 3 is an opening for insertion or withdrawal of the crank shaft member 7; this opening is normally closed by a cover 14 having an internal outstanding annular flange 15 whose edge is adapted to engage the crank pin 16 and prevent displacement of the crank member 7 axially from its proper position. Surmounting the crank chamber 3 is a cylinder structure 20 whose internal bore opens into said crank chamber 3 through an aperture in the upper wall thereof. The air pump piston 21 in this cylinder is connected to the crank pin 16 by means of a connecting rod 22 and a pin 23 in the usual manner. In Fig. II, the piston 21 is shown at the end of its upward or delivery stroke, while in Fig. III it is shown at about the end of its downward or suction stroke. The air to be compressed is admitted to the pump chamber 20, at about the end of the downward stroke, through an annular series of sloping ports 24 in its wall, and the air is delivered from the pump cylinder through an outlet 25 provided with a spring actuated check valve 26 whose stem is guided in a bore in a cap 27, which closes an opening in the upper end of the cylinder 20 through which said check valve 26 may be inserted or removed.

It will be understood that the automobile gear case 6 normally contains a bath of lubricant which more or less completely submerges the gears 12, etc., therein and that this bath of lubricant extends into the gear chamber 2 of the pump casing 4 and so lubricates the driving pinion 8. It will further be seen that the crank shaft 7 is hollow, and that its bore opens into the gear chamber 2 at one end and is closed at the other end, in the crank chamber 3, by a wall having a plugged opening 28 useful for cleaning purposes. From the inner end of the bore of the crank shaft 7, a duct or passage 30 extends through the crank to the bearing surface of the crank pin 16, so that passage is afforded for lubricant from the automobile gear case 6 via the shaft 7 to lubricate the crank pin; a sufficient supply of lubricant being insured by centrifugal action in the duct 30. As shown, there is in the sleeve 4 an internal groove containing a wide ring of lubricant-absorbent packing 31 supplied with lubricant through a longitudinal groove 32 in the sleeve wall extending from said packing to the gear chamber 2,—an ample supply being insured by the splash action of the pinion 8.

From Figs. II and III, it will be seen that the cylinder structure 20 has an internal groove in which is accommodated a packing ring 33 of lubricant-absorbent material so placed so as to be over-traveled by the piston 21 on its downward stroke and thus lubricate its wearing surface. As shown, the groove containing the packing 33 is formed by enlargement of the cylinder bore at the lower end, adjacent the upper wall of the crank chamber 3. Lubricant may conveniently be supplied to the annular packing 33 from lubricating cups 34 mounted on bosses 35 at the lower end of the cylinder and delivering into the packing groove.

From the foregoing description, it will be seen that the crank shaft and crank pin bearing are effectively lubricated without access of lubricant being permitted to the air space of the pump in the crank chamber 3 and the cylinder structure 20, so that there is no contamination of the air handled by the pump such as would result if the crank pin 16 were lubricated on the splash system from the crank chamber 3 itself. The packing ring 33 effectively lubricates the rubbing surfaces of the piston 21 without risk of oil being mixed with the air in suspension, so as to endanger the rubber tire of the vehicle. The lubrication thus afforded the piston is more certain and effectual than if the packing 33 were arranged in the path of the lower edge of the piston so as to be compressed thereby at the end of its downward stroke and transmit the oil to it in consequence.

Having thus described my invention, I claim:

1. In an automobile tire-pump, the combination of a crank and gear casing adapted to be secured to the automobile gear case and having a gear chamber receiving lubricant from said gear case and a separate crank chamber; and a crank shaft for the pump extending from said gear chamber to said crank chamber and having a crank and a crank-pin, with means of passage via the shaft from said gear chamber to the bearing surface of the crank-pin; so that lubricant may be supplied therethrough from the automobile gear case to lubricate the crank-pin of the pump without access of such lubricant to the air space of the pump to contaminate the air.

2. In an automobile tire-pump, the combination of a crank and gear casing adapted to be secured to the automobile gear case and having a gear chamber receiving lubricant from said gear case and a separate crank chamber; and a hollow crank shaft for the pump extending from said gear chamber to said crank chamber and having a crank and a crank-pin, with a passage to the bearing surface of the latter from the bore of the shaft; so that lubricant may be supplied from the automobile gear case through the shaft to lubricate the crank-pin of the pump without access of such lubricant to the air space of the pump to contaminate the air.

3. In an automobile tire-pump, the combination of a unitary crank and gear casing structure adapted to be secured to the automobile gear case and having a gear chamber receiving oil from said gear case and a separate crank chamber connected thereto by a bearing sleeve having therein a ring of lubricant-absorbent packing supplied from said gear chamber; and a crank-shaft and crank of anti-friction metal in said bearing sleeve and said crank chamber affording passage for lubricant from said gear chamber to the bearing surface of the crank-pin.

4. In an automobile tire-pump, the combination of a unitary crank and gear casing structure adapted to be secured to the automobile gear case and having a gear chamber receiving oil from said gear case and a separate crank chamber; a pump cylinder structure with an internal groove surmounting said crank chamber; a lubricating packing in said groove overtraveled by the piston on its downward stroke; and a crank shaft and crank member extending from said gear chamber into said crank chamber and affording passage for lubricant from the gear chamber to lubricate the crank-pin.

In testimony whereof, I have hereunto signed my name at Philadelphia, Pennsylvania, this 7th day of May, 1920.

JOHN W. SMITH.

Witnesses:
JAMES H. BELL,
E. L. FULLERTON.